(12) United States Patent
Yamashita (10) Patent No.: US 6,595,708 B1
(45) Date of Patent: Jul. 22, 2003

(54) OPTICAL RECEIVER CIRCUIT AND OPTICAL MODULE USING SAME IN OPTICAL COMMUNICATION SYSTEM

(75) Inventor: Takeshi Yamashita, Yokohama (JP)

(73) Assignee: Opnext Japan, Inc., Totsuk-Ku (JP)

( * ) Notice: Subject to any disclaimer, the term of this patent is extended or adjusted under 35 U.S.C. 154(b) by 0 days.

(21) Appl. No.: 09/456,704

(22) Filed: Dec. 9, 1999

(30) Foreign Application Priority Data

Dec. 10, 1998 (JP) .......................... 10-351334

(51) Int. Cl.[7] .................. H04B 10/00; H04B 10/06
(52) U.S. Cl. ....................... 398/202; 398/208
(58) Field of Search ........................ 359/189

(56) References Cited

U.S. PATENT DOCUMENTS

| | | | | |
|---|---|---|---|---|
| 4,545,076 A | * | 10/1985 | Biard et al. ............... | 330/261 |
| 5,612,810 A | * | 3/1997 | Inami et al. ............. | 250/214 A |
| 5,790,295 A | * | 8/1998 | Devon .................... | 250/214 A |
| 5,955,918 A | * | 9/1999 | Uno ........................ | 379/88.01 |
| 6,151,150 A | * | 11/2000 | Kikuchi ..................... | 359/189 |
| 6,181,454 B1 | * | 1/2001 | Nagahori et al. ............. | 330/9 |

FOREIGN PATENT DOCUMENTS

| | | |
|---|---|---|
| JP | 08084160 | 3/1996 |
| JP | 09181687 | 7/1997 |

* cited by examiner

*Primary Examiner*—Jason Chan
*Assistant Examiner*—Agustin Bello
(74) *Attorney, Agent, or Firm*—Kenyon & Kenyon

(57) ABSTRACT

An optical receiver circuit comprising: a pre-amplifier for amplifying a signal supplied from a photodetector to output positive and negative signals; first and second peak hold circuits for detecting maximum levels of these positive and negative signals respectively; an offset canceler circuit for compensating the positive signal at the maximum level of the negative signal, for compensating the negative signal at the maximum level of the positive signal, and for then performing differential amplification; and a level shift circuit for replacing an output signal level of the first peak hold circuit with a signal level higher than an actual value for a period of time that light input to the photodetector is in a no-input signal state.

5 Claims, 8 Drawing Sheets

FIG. 9

OPTICAL RECEIVER CIRCUIT AND OPTICAL MODULE USING SAME IN OPTICAL COMMUNICATION SYSTEM

BACKGROUND OF THE INVENTION

1. Field of the Invention

The present invention relates to an optical receiver circuit used in an optical communication system. More particularly, the invention pertains to an optical receiver circuit suitable for receiving burst digital data, and an optical module using the same in an optical communication system.

2. Description of the Related Art

In general, unlike timewise continuous signal output from video and audio equipment, digital data output from computers typical of information processing equipment has a bursty characteristic, i.e., data is output intensively for a certain period of time and no data is output for the remaining period of time. In an optical communication system for transmitting and receiving such burst data, it is required to provide an optical receiver circuit capable of receiving burst data with high stability.

Figure 1:
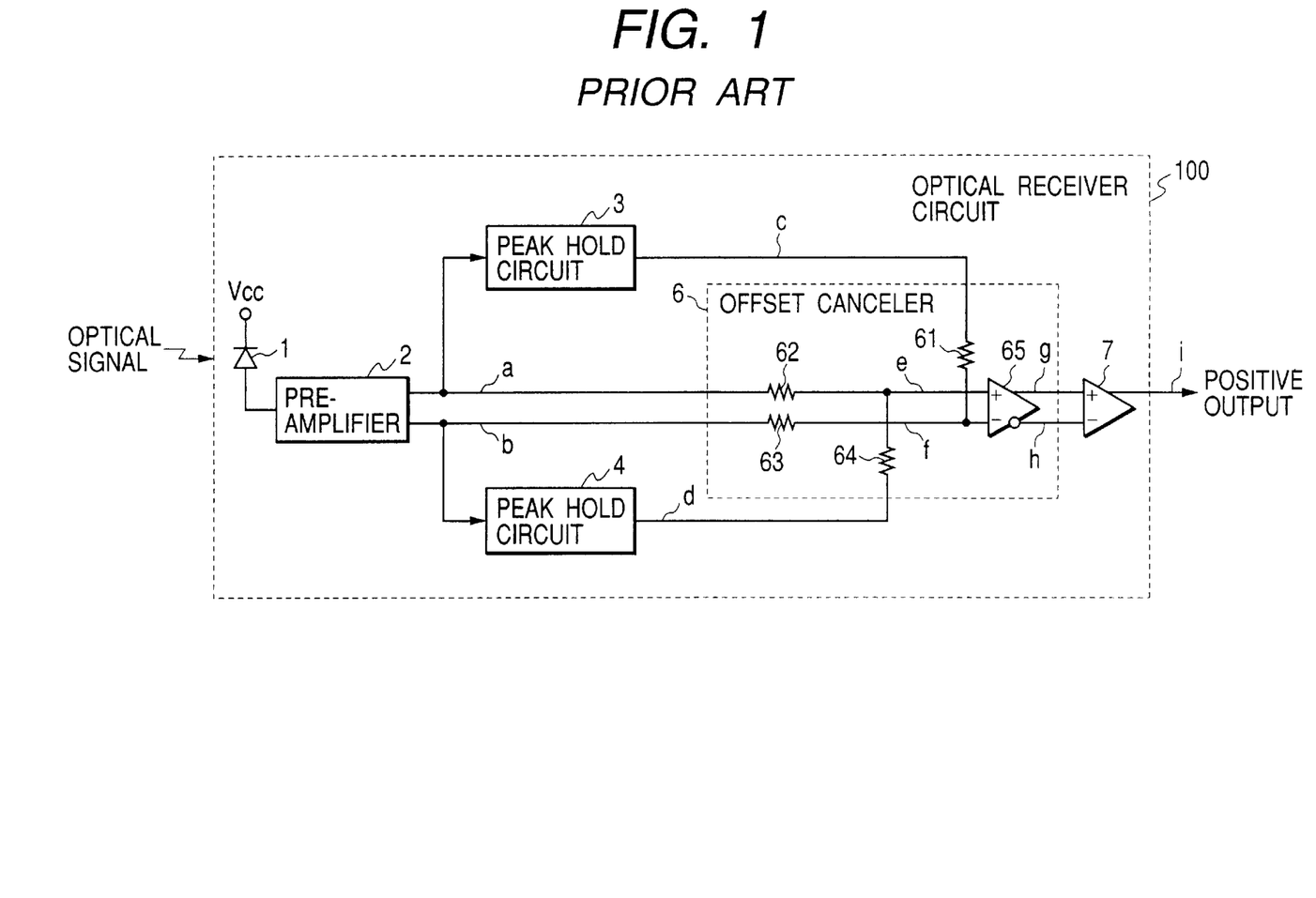
FIG. 1 is a block diagram showing an example of an optical receiver circuit according to the related art.

Referring to FIG. 1, there is shown an example of a conventional optical receiver circuit 100 disclosed in Japanese Unexamined Patent Publication. No. 8 (1996)-84160. FIGS. 2A to 2E show waveforms in respective parts of the optical receiver circuit 100.

Upon receiving an optical signal, a photodetector 1 converts the received optical signal into an electrical signal, which is then supplied to a pre-amplifier 2. The pre-amplifier 2 amplifies the electrical signal supplied from the photodetector 1 to produce positive and negative signals "a" and "b".

Figure 2A:
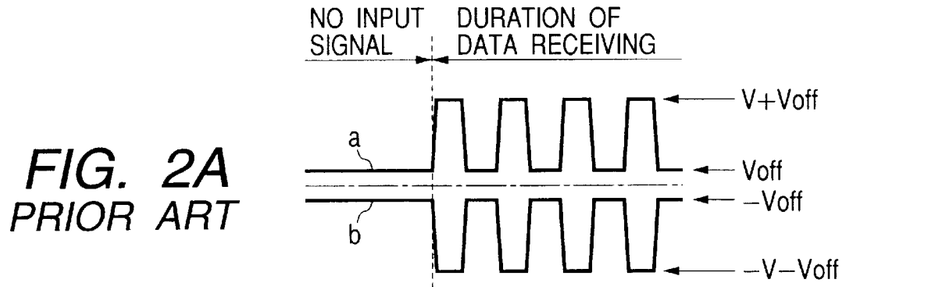
FIG. 2A shows waveforms of signals "a" and "b" in the optical receiver circuit diagrammed in FIG. 1.

Under condition that an offset voltage Voff exists in an output of the pre-amplifier 2, signal levels of the positive and negative signals "a" and "b" in a no-input signal state are "Voff" and "−Voff" respectively, "0" levels thereof in a burst data receiving state are also "Voff" and "−Voff" respectively, and "1" levels thereof in the burst data receiving state are "V+Voff" and "−V−Voff" respectively (FIG. 2A).

A first peak hold circuit 3 detects a value of a maximum level of the positive signal "a" (hereinafter referred to as a peak value) and generates an output signal "c", which has a signal level of offset voltage "Voff" in the no-input signal state and a "1" level voltage "V+Voff" in the data receiving state.

Figure 2B:
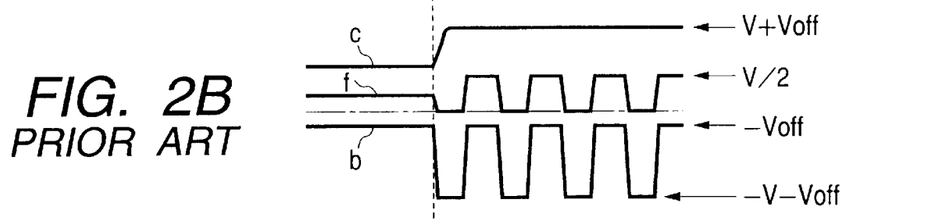
FIG. 2B shows waveforms of signals "b", "c" and "f" in the optical receiver circuit diagrammed in FIG. 1.
Figure 2C:
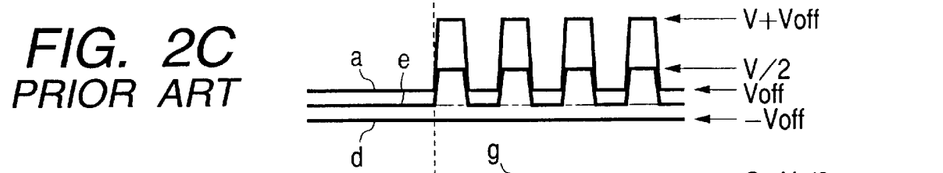
FIG. 2C shows waveforms of signals "a", "d" and "e" in the optical receiver circuit diagrammed in FIG. 1.

A second peak hold circuit 4 detects a peak value of the negative signal "b", and generates an output signal "d", which has a signal level of offset voltage "−Voff" in the no-input signal state and a "0" level voltage "−Voff" in the data receiving state (FIG. 2C).

In FIG. 1, resistors 61 to 64 and a differential amplifier 65 constitute an offset canceller 6. When the output signal "c" of the first peak hold circuit 3 and the negative signal "b" are supplied to a negative input terminal of the differential amplifier 65 through the resistors 61 and 63 having the same resistance value, the levels of the signals "b" and "c" are averaged to provide a signal "f" as a negative input to the differential amplifier 65. In the signal "f" thus provided, a "0" level voltage in the data receiving state is "V/2", and a "1" level voltage in the data receiving state and an output voltage in the no-input signal state are zero (FIG. 2B).

In the same manner as mentioned above, when the positive signal "a" and the output signal "d" of the second peak hold circuit 4 are supplied to a positive input terminal of the differential amplifier 65 through the resistors 62 and 64 having the same resistance value, the levels of the signals "a" and "d" are averaged to provide a signal "e" as a positive input to the differential amplifier 65. In the signal "e" thus provided, a "0" level voltage in the data receiving state and an output voltage in the no-input signal state are zero, and a "1" level voltage in the data receiving state is "V/2".

Figure 2D:
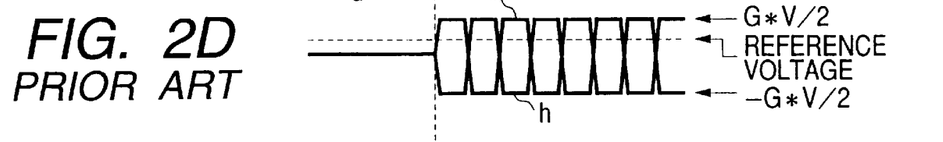
FIG. 2D shows waveforms of signals "g" and "h" in the optical receiver circuit diagrammed in FIG. 1.

Through the above signal processing, offset voltages "Voff" contained in the signals "a" and "b" output from the pre-amplifier 2 can be canceled mutually. That is, the signals "e" and "f" input to the differential amplifier 65 are subjected to differential amplification on a basis of gain G, thereby outputting a positive signal "g" and a negative signal "h" (FIG. 2D). These output signals "g" and "h" are not affected by output offset "Voff" of the pre-amplifier 2, and both the "1" level pulse duty ratio (half value width of pulse per cycle) and the "0" level pulse duty ratio in the signals "g" and "h" are 0.5, i.e. , the signals "g" and "h" are equivalent to each other.

The signal "g" output from the differential amplifier 65 is distinguished as a binary signal in the comparator 7 by comparing with the signal "h", thereby providing a positive output signal "i". In the comparator 7, a binary judgment is carried out to check whether a difference voltage between the signals "g" and "h" is in a positive state or a negative state. In this case, since both the signals "g" and "h" vary symmetrically, the comparator 7 performs the binary judgment with a judgment reference voltage (threshold) which is equivalent to an average value of "1" and "0" levels of the signals "g" and "h". If the judgment reference voltage in the comparator 7 can be substantially set to an average value of "1" and "0" levels of the signals "g" and "h", a binary signal "i" having an equal duty ratio may be attained as an output of the comparator 7 regardless of a value of output voltage "V" from the pre-amplifier 2 in the data receiving state.

However, in the circuit configuration shown in FIG. 1, the levels of the signals "g" and "h" are equal to each other in the no-input signal state. Consequently, an operation of comparing the signals "g" and "h" in the no-input signal state becomes unstable, making it difficult to attain a correct result in distinction by the comparator 7. When the pre-amplifier 2 is in the no-input signal state and when the pre-amplifier 2 outputs a "0" level signal of data input, it is required for the comparator 7 to distinguish the input signal "g" as a low level. Hence, for attaining a correct result of binary judgment in the no-input signal state, it is inevitable to use a substantial judgment reference voltage having a value larger than the average value of "1" and "0" levels of the signals "g" and "h".

Figure 2E:
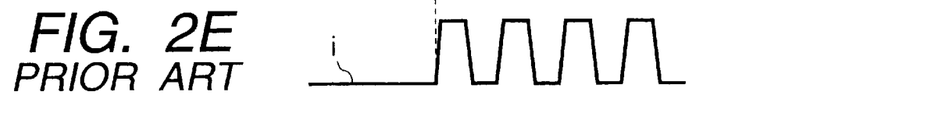
FIG. 2E shows a waveform of signal "i" in the optical receiver circuit diagrammed in FIG. 1.

If the judgment reference voltage is larger than the average value of "1" and "0" levels of the signals "g" and "h", however, there arises a problem of deterioration in duty ratio of the output signal "i". FIG. 2E shows a waveform of the output signal "i" having a deteriorated duty ratio. The duty ratio of the output signal "i" varies depending on an amplitude voltage "V" of the positive signal "a", i.e., a magnitude of the signal output from the photodetector 1.

SUMMARY OF THE INVENTION

It is therefore an object of the present invention to obviate the above-mentioned disadvantage of the related art by providing an optical receiver circuit having a duty ratio which does not deteriorate in a burst data receiving state and an optical module containing the optical receiver circuit.

In accomplishing this object of the present invention and according one aspect thereof, there is provided an optical receiver circuit in which a level shift circuit is disposed between a first peak hold circuit for detecting a maximum level of a positive signal and an offset canceller circuit so that an output signal level of the first peak hold circuit is made higher than an actual level for a period of time that an amplitude of a positive signal output from a pre-amplifier is smaller than a predetermined amplitude value.

More specifically, according to the present invention, there is provided a optical receiver circuit comprising: a pre-amplifier for amplifying a signal supplied from a photodetector to output positive and negative signals; a first peak hold circuit for detecting a maximum level of the positive signal output from the pre-amplifier; a second peak hold circuit for detecting a maximum level of the negative signal output from the pre-amplifier; an offset canceller circuit for compensating the positive signal at an output signal level of the second peak hold circuit, for compensating the negative signal at an output signal level of the first peak hold circuit, and for then performing differential amplification; and a level shift circuit for replacing the output signal level of the first peak hold circuit with a predetermined signal level higher than an actually detected maximum signal level for a period of time that light input to the photodetector is in a no-input signal state; whereby the negative signal is compensated at the predetermined signal level.

In the circuit arrangement mentioned above, a level of a positive signal input to a comparator in the no-input signal state can be lowered to allow the use of an average value of "1" and "0" levels as a judgment reference voltage. Therefore, according to the present invention, a signal level in the no-input signal state can be reliably distinguished as a low level, making it possible to implement an optical receiver circuit capable of preventing deterioration in duty ratio.

The level shift circuit noted above, for example, comprises a bottom hold circuit for holding a minimum level value of the positive signal output from the pre-amplifier, a bottom level shift circuit for increasing an output signal level of the bottom hold circuit by a predetermined value, and a maximum level selector circuit for selectively delivering an output signal of the first peak hold circuit or an output signal of the bottom level shift circuit, whichever is higher in terms of signal level.

The above and other objects, features and advantages of the present invention will become more apparent from the following detailed description with reference to the accompanying drawings.

DESCRIPTION OF THE PREFERRED EMBODIMENTS

The present invention, relating to an optical receiver and an optical module using the same, will now be described in detail by way of example with reference to the accompanying drawings.

In FIGS. 1 to 9, like reference numerals designate like or corresponding parts throughout.

Figure 3:
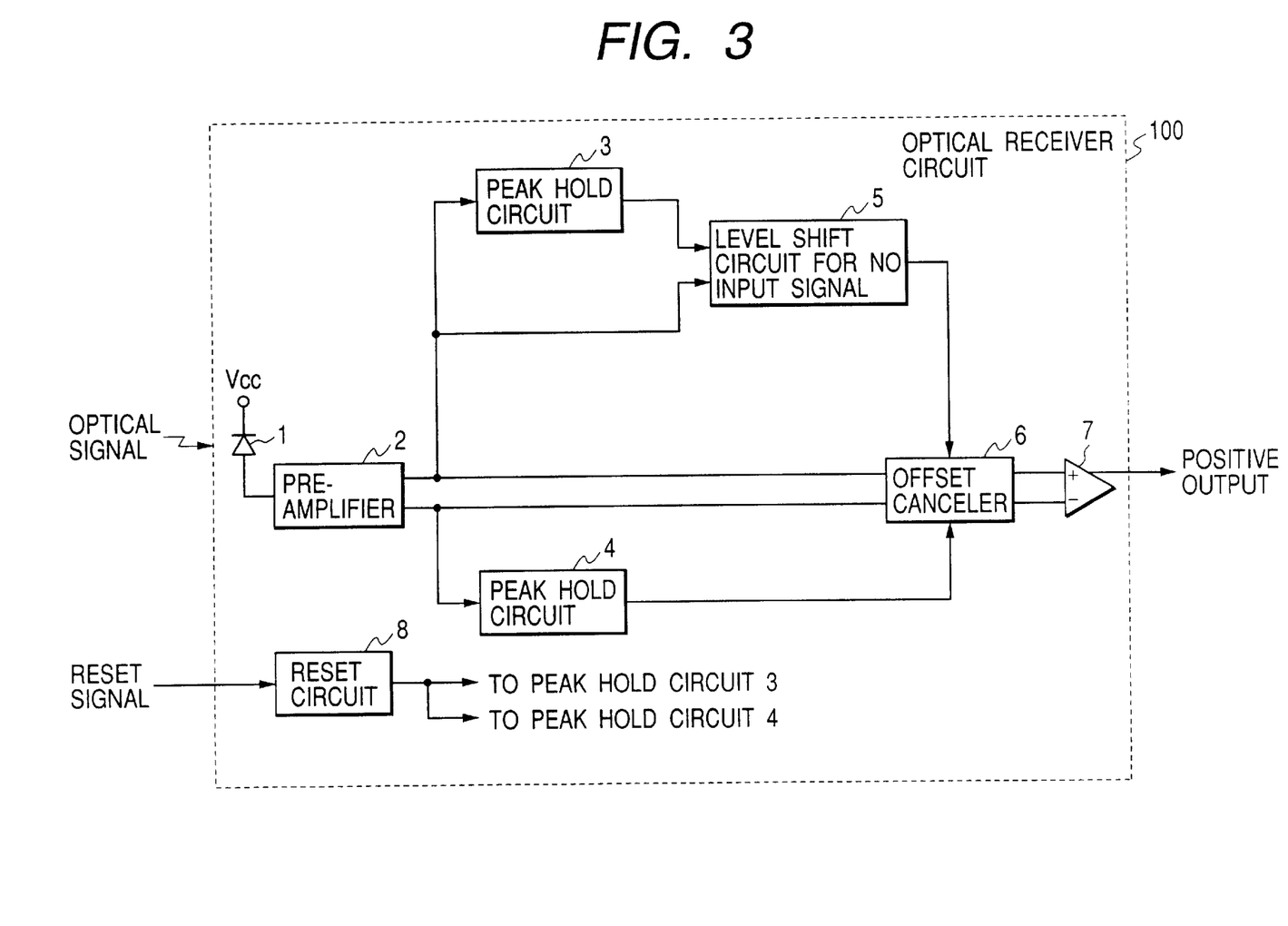
FIG. 3 is a block diagram showing a configuration of an optical receiver circuit according to the present invention.

FIG. 3 shows a block diagram of an optical receiver circuit according to the present invention.

In FIG. 3, reference numeral 5 indicates a level shift circuit connected between a first peak hold circuit 3 and an offset canceler circuit 6, and reference numeral 8 indicates a reset circuit necessary for configuring an optical module which will be described later.

Figure 4:
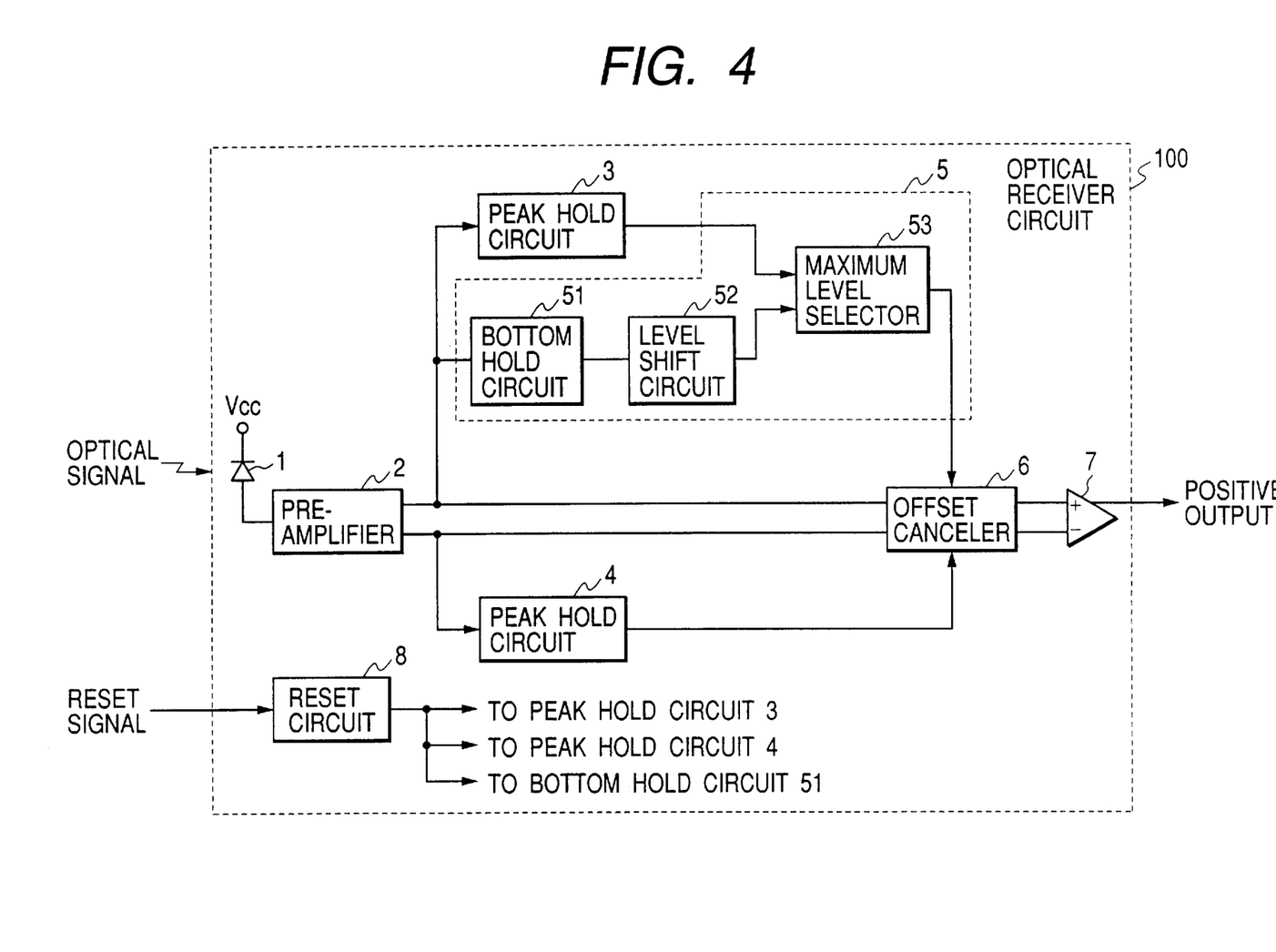
FIG. 4 is a block diagram showing a preferred embodiment of the optical receiver circuit according to the present invention, indicating details of a level shift circuit 5.
Figure 5:
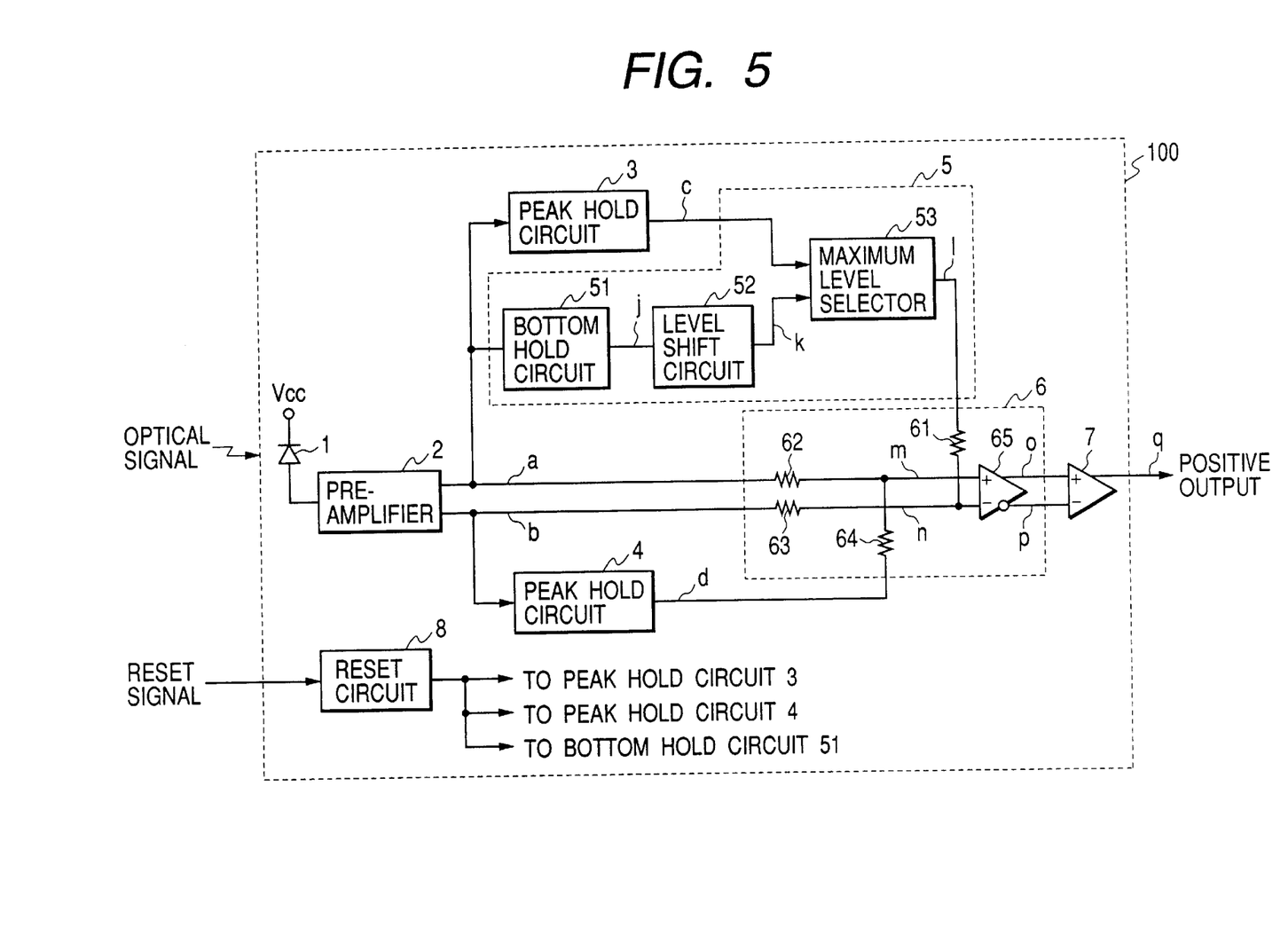
FIG. 5 is a block diagram showing a preferred embodiment of the optical receiver circuit according to the present invention, with an offset canceler circuit 6 arranged in the same fashion as in FIG. 1.

FIG. 4 shows a block diagram of an optical receiver circuit 100 according to the present invention, indicating details of the level shift circuit 5. FIG. 5 shows a block diagram of the optical receiver circuit 100 according to the present invention, with the offset canceler circuit 6 arranged in the same fashion as in FIG. 1. FIGS. 6A to 6F show signal waveforms at respective parts of the optical receiver circuit in a burst data receiving state.

In FIGS. 4 and 5, reference numeral 51 indicates a bottom hold circuit for holding a bottom value of a positive signal "a" output from a pre-amplifier 2, reference numeral 52 indicates a bottom level shift circuit for shifting a level of a signal "j" output from the bottom hold circuit 51 by a predetermined voltage ΔV, and reference numeral 53 indicates a maximum level selector circuit for selecting a signal "c" output from the first peak hold circuit 3 or a signal "k" output from the bottom level shift circuit 52, whichever is higher in terms of signal level. A signal "i" output from the maximum level selector circuit 53 is fed to a resistor 61 of the offset canceler circuit 6. In the present preferred embodiment, the bottom hold circuit 51, the bottom level shift circuit 52 and the maximum level selector circuit 53 constitute the level shift circuit 5.

Figure 6A:
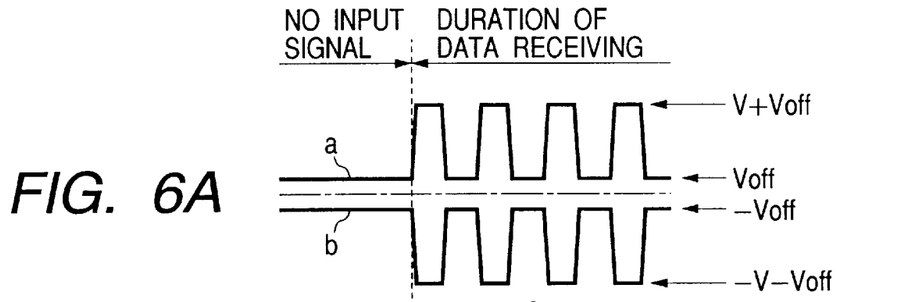
FIGS. 6A to 6F show signal waveforms at respective parts of an optical receiver circuit 100 indicated in FIG. 5 in a burst data receiving state.
Figure 6B:
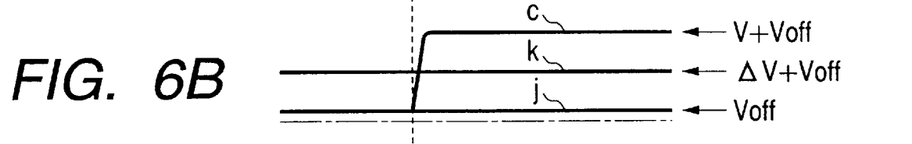

After a photodetector 1 receives an optical signal until the first peak hold circuit 3 outputs the signal "c" and a second peak hold circuit 4 outputs a signal "d", the operations are performed in the same manner as in the related art described with reference to FIG. 1 (shown in FIG. 6A, FIG. 6B and part of FIG. 6D).

The bottom hold circuit 51 detects a bottom value of the positive signal "a" output from the pre-amplifier 2 and holds the detected bottom value. Then, the bottom hold circuit 51 outputs a signal "j" indicating a "0" level voltage Voff of the positive signal "a" in no-input signal and data receiving states. The bottom level shift circuit 52 converts the signal "j" to a signal "k" having a voltage value "ΔV+Voff" which is higher than Voff by a predetermined voltage ΔV (FIG. 6B).

Figure 6C:
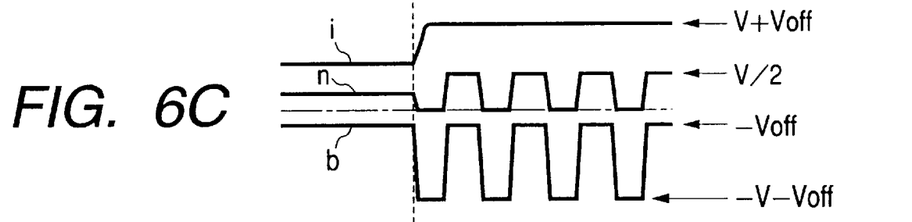

The maximum level selector circuit 53 selects the signal "c" output from the first peak hold circuit 3 or the signal "k" output from the bottom level shift circuit 52, whichever is higher in terms of signal level, and the maximum level selector circuit 53 outputs the selected signal "c" or "k" as a signal "i". In the no-input signal state, the signal "k" is selected to output the signal "i" having a level of "ΔV+Voff". In the data receiving state, the signal "c" is selected to output the signal "i" having a level of "V+Voff" (FIG. 6C).

An amplitude of the positive signal "a" decreases with a decrease in optical signal receiving level. If the level of the signal "c" output from the first peak hold circuit 3 decreases below the level of the signal "k" output from the bottom level shift circuit 52, the maximum level selector circuit 53 selects the signal "k" even in the data receiving state. With respect to the offset canceler circuit 6, this condition signifies that the level of the signal "c" thus decreased is maintained at the level of the signal "k". In other words, when an amplitude V of the positive signal "a" (i.e., a difference between the signal "c" and the signal "j" output from the bottom hold circuit 3) becomes smaller than a predetermined value, the level shift circuit 5 increases the signal "c" output from the first peak hold circuit to a level higher than an actual value and supplies the signal "c" thus increased to the offset canceler circuit 6.

Figures 6D, 6E:
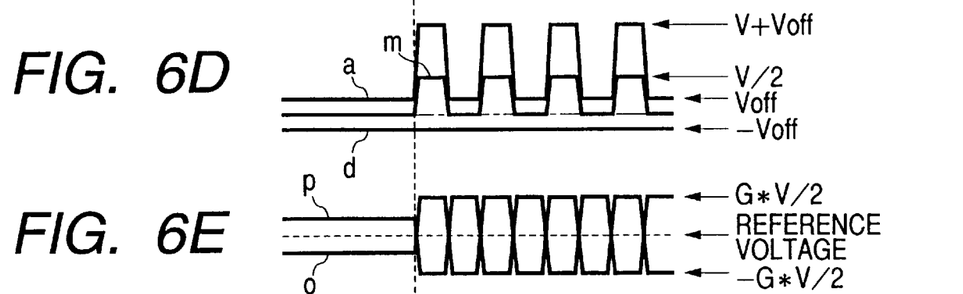

The second peak hold circuit 4 detects a peak value of a negative signal "b" and outputs a signal "d" indicating a "0" level voltage "−Voff" of the negative signal "b" in the no-input signal state and the data receiving state (FIG. 6D).

Resistors 61 and 63 have the same resistance value mutually, and a signal "n" indicating an average value of the negative signal "b" and the signal "i" output from the maximum level selector circuit 53 appears at a connection point therebetween. In the no-input signal state, the signal "n" is ΔV/2. In the data receiving state, the "0" level thereof is V/2 and the "1" level thereof is zero (FIG. 6C).

Resistors 62 and 64 also have the same resistance value mutually, and a signal "m" indicating an average value of the positive signal "a" and the signal "d" output from the second peak hold circuit 4 appears at a connection point therebetween. In the no-input signal state, the signal "m" is zero. In the data receiving state, the "0" level thereof is zero and the "1" level thereof is V/2 (FIG. 6D).

Consequently, when the photodetector 1 is in the no-input signal state, the negative signal "n" becomes larger than the positive signal "n" by ΔV/2. When the photodetector 1 is in the data receiving state, each of the signals "m" and "n" becomes equivalent to a signal to be attained in a case where offset voltages Voff contained in the signals "a" and "b" output from the pre-amplifier 2 are canceled and where peak values of the signals "a" and "b" are made equal to each other regardless of a degree of input signal amplitude V.

The signals "m" and "n" are fed to a differential amplifier 65 having a gain G for output of a positive signal "o" and a negative signal "p". In the no-input signal state, the levels of the positive signal "o" and negative signal "p" output from the differential amplifier 65 become "−G*ΔV/2" and "G*ΔV/2" respectively. In the data receiving state, the "1" level of the positive signal "o" becomes "G*V/2", the "0" level of the positive signal "o" becomes "−G*V/2", the "1" level of the negative signal "p" becomes "−G*V/2", and the "0" level of the negative signal "p" becomes "G*V/2". Not affected by an offset voltage Voff of the pre-amplifier 2, both the signals "o" and "p" provide an equal duty ratio (FIG. 6E).

Figure 6F:
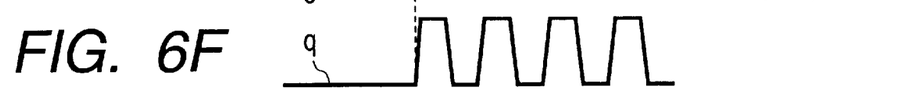

In the present preferred embodiment of the invention, the comparator 7 converts the signal "o" to a binary output signal "q" by comparing with the signal "p". Since the signal "o" has a voltage level lower than that of the signal "p" in the no-input signal state and the substantial judgment reference voltage in the comparator 7 becomes equal to the average value of the "1" and "0" levels of the signals "o" and "p", the comparator 7 can correctly recognize that the "1" level of the signal "o" is a high level and that the "0" level of the signal "o" and a no-input signal level thereof are low levels. In the data receiving state, the output signal "q" of the comparator 7 has an equal duty ratio (FIG. 6F).

While the differential amplifier 65 delivers the positive signal "o" and negative signal "p" which are differential signals in the preferred embodiment mentioned above, there may also be provided such a modified arrangement that the differential amplifier 65 delivers the signal "o" only to the comparator 7, which is then converted to a binary output signal "q" according to a fixed judgment reference voltage applied to the comparator 7 instead of the signal "p".

Where an optical receiver circuit is mounted on a module, various burst data having different amplitudes are input to the optical receiver circuit. Therefore, the optical receiver circuit 100 shown in FIGS. 3 to 5 is provided with the reset circuit 8 for resetting a retained value to a no-input signal level upon each interruption of burst data, thus enabling the peak hold circuits 3 and 4 and the bottom hold circuit 51 to hold peak and bottom values respectively according to an amplitude of input signal.

The structure of the offset canceler circuit 6 used in the optical receiver circuit of the present invention is not limited to that shown in FIG. 5. For example, in a modified form, an adder circuit may be provided for performing addition on two signals instead of using a pair of the resistors 61 and 63 and a pair of the resistors 62 and 64. Further, in another modified form, a differential amplifier may be provided in lieu of the resistors 61 and 64.

Figure 7:
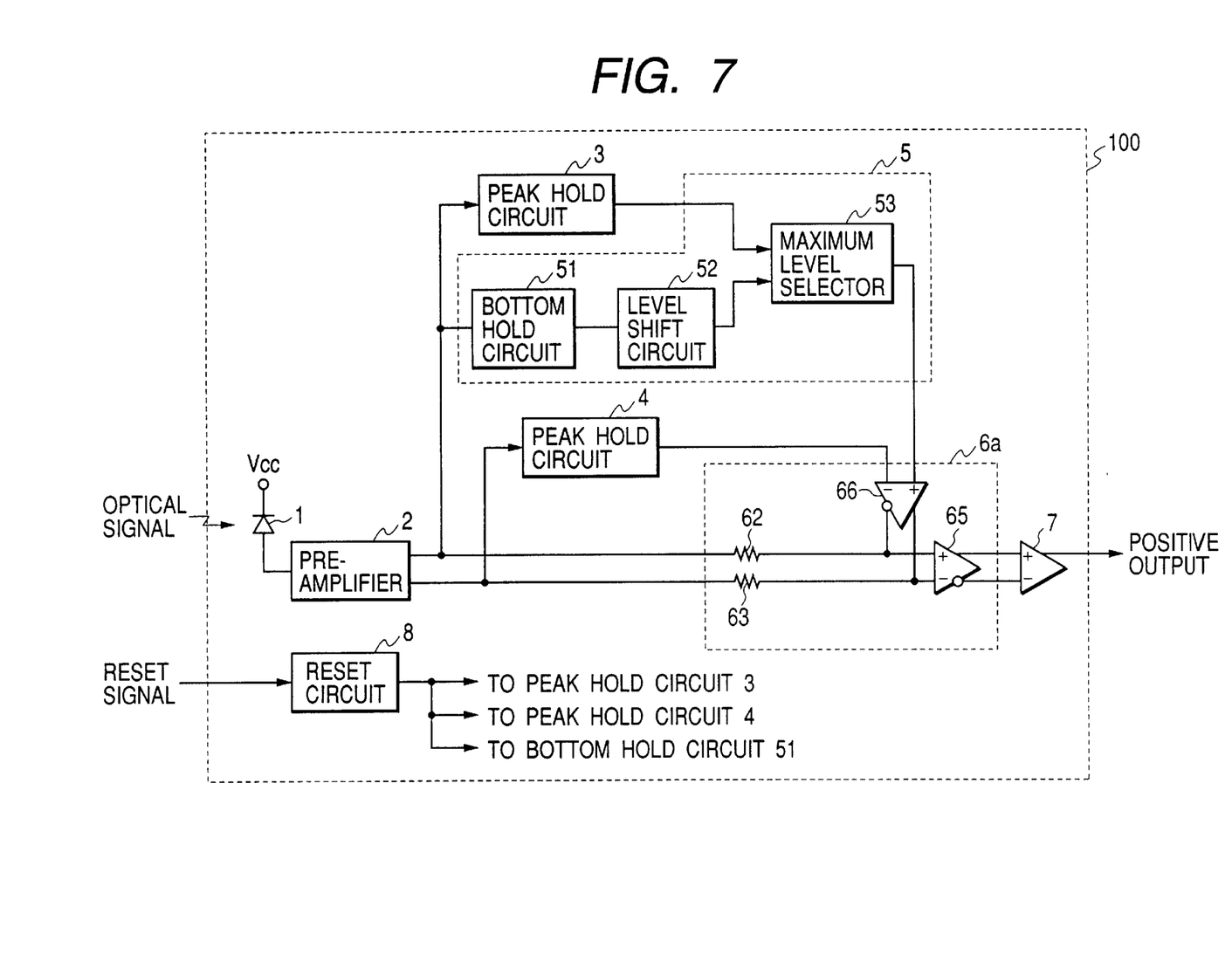
FIG. 7 shows another example of a configuration of the offset canceler circuit 6 in the optical receiver circuit according to the present invention.

Referring to FIG. 7, there is shown another preferred embodiment of an offset canceler circuit 6a using a differential amplifier 66 in lieu of the resistors 61 and 64.

The signal "i" output from the maximum level selector circuit 53 is supplied to a positive input terminal of the differential amplifier 66, and the signal "d" output from the second peak hold circuit 4 is supplied to a negative input terminal thereof. Further, a positive current output from the differential amplifier 66 is fed to the output side of the resistor 63, and a negative current output therefrom is fed to the output side of the resistor 62. In this arrangement, an output current ratio of the differential amplifier 66 varies depending on a level difference between the signal "i" output from the maximum level selector circuit 53 and the signal "d" output from the second peak hold circuit 4. Thus, positive and negative signals to be input to the differential amplifier 65 are produced under condition that a degree of voltage drop at each of the resistors 62 and 63 having the same resistance value is controlled.

As mentioned in the foregoing, in the no-input signal state, the output signal level of the no-input signal level shift circuit 5 is higher than the level Voff of the positive signal "a" output from the pre-amplifier 2 by ΔV. Therefore, using the corresponding positive and negative currents output from the differential amplifier 66, a negative signal input to the differential amplifier 65 can be made higher than a positive signal input thereto in the no-signal input state. On this account, an operation output in the no-input signal state can be distinguished reliably as a low level by setting the judgment reference voltage of the comparator 7 to an average value of the "1" and "0" levels of the positive and negative signals output from the offset canceler circuit 6.

In the data receiving state, an offset component contained in the current output of the differential amplifier 66 cancels the offset voltage Voff of the positive signal "a" and negative signal "b" output from the pre-amplifier 2. Thus, the differential amplifier 65 outputs positive and negative signals having no offset. In this case, since the judgment reference voltage is set to an average value of the "1" and "0" levels output from the offset canceler circuit 6a, the comparator 7 outputs a signal without deterioration in duty ratio.

Figure 8:
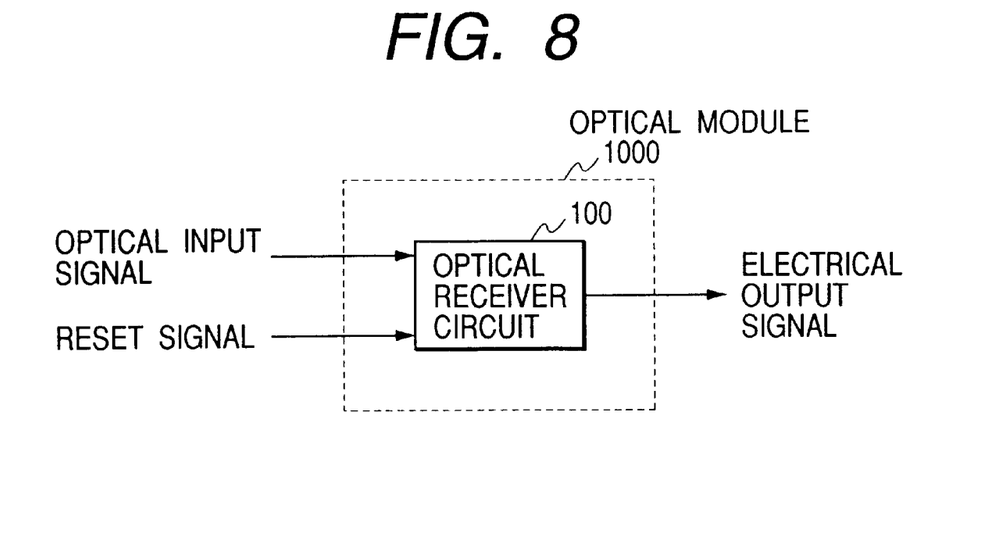
FIG. 8 is an explanatory diagram of an optical module containing the optical receiver circuit according to the present invention.

Referring to FIG. 8, there is shown an explanatory diagram of an optical module 1000 containing the optical receiver circuit 100 according to the present invention. The optical module 1000 is configured as mentioned below.

The photodetector 1 for receiving an optical input signal is optically coupled with a transmission line comprising an optical filer or optical waveguide. The photodetector 1 is electrically connected with the pre-amplifier 2, and these circuit elements are hermetically sealed to form an optical device module. For hermetic sealing, a material such as a metallic material having an electric shielding characteristic, a ceramic material, or a resin material based on plastic, for example, may be used.

The photodetector 1, pre-amplifier 2 and peripheral circuits thereof are mounted on a small-sized circuit board, which is attached to a flat part in a casing for an optical device module, so as to keep optical coupling therebetween. The optical device module thus formed is mounted on a circuit board, made of a material such as glass epoxy resin or ceramic, on which the first peak hold circuit 3, the second peak hold circuit 4, the level shift circuit 5 and other peripheral circuits are arranged. Thus, the optical receiver circuit 100 according to the present invention can be provided. Further, metallic terminals for a reset input signal, an electrical output signal and other electrical inputs/outputs for external interfacing are equipped on the optical receiver circuit 100 to form the optical module 1000.

For electrical shielding on the optical module 1000, the entire structure thereof may be covered with a material such as metal or plastic having conductive coating, except input/output terminal parts and heat dissipation port parts. Having the optical receiver circuit 100 designed according to the present invention, the optical module 1000 can reliably distinguish an output signal as a low level in the no-input signal state and deliver an output signal without deterioration in duty ratio in the data receiving state.

Figure 9:
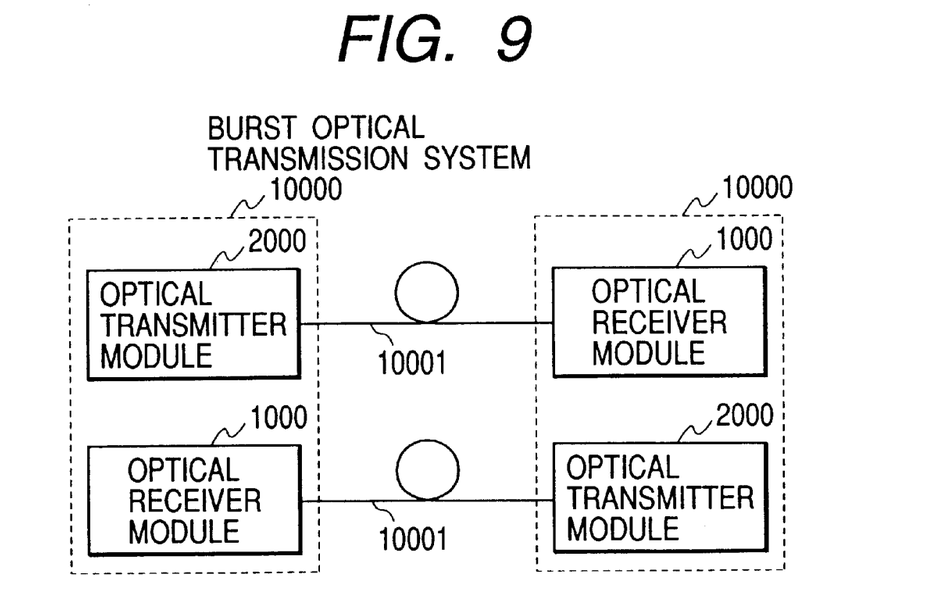
FIG. 9 is an explanatory diagram of a burst optical transmission system using the optical module according to the present invention.

Referring to FIG. 9, there is shown an explanatory diagram of a burst optical transmission system 10000 using the optical module 1000 according to the present invention.

The burst optical transmission system 10000 comprises an optical transmitter module 2000 and an optical receiver module corresponding to the optical module 1000 according to the present invention. The burst transmission systems 10000 are connected mutually through an optical fiber cable 10001 for carrying out transmission and reception of optical burst data. Using the optical module 1000 according to the present invention, the burst optical transmission system 10000 can prevent an error in distinction due to deterioration in duty ratio which would otherwise be incurred.

While the burst optical transmission system 10000 of a two-fiber bi-directional type is exemplified in FIG. 9, it is also practicable to configure a burst optical transmission system of a one-fiber bi-directional type by providing optical wavelength multiplexer and demultiplexer circuits on the transmission line side of the optical transmitter and receiver modules in the system.

As set forth hereinabove and according to the present invention, a positive output signal level of the offset canceler circuit can be made lower than a negative output signal level thereof, allowing the use of an average of "1" and "0" levels as a reference voltage for binary judgment. Thus, in the no-input signal state, an input level can be distinguished reliably as a low level, and in the data receiving state, a binary signal can be attained without deterioration in duty ratio.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical receiver circuit comprising:

a photodetector for converting an optical signal into an electrical signal;

a pre-amplifier for amplifying the electrical signal to output positive and negative signals;

a first peak hold circuit for holding a maximum level value of the positive signal output from said pre-amplifier;

a second peak hold circuit for holding a maximum level value of the negative signal output from said pre-amplifier;

a level shift circuit for making an output signal level of said first peak hold circuit higher than an actual level for a period of time that an amplitude of the positive signal output from said pre-amplifier is smaller than a predetermined amplitude value, said level shift circuit including a bottom hold circuit for holding a bottom value of the positive signal output from said pre-amplifier, a bottom level shift circuit for shifting a level of a signal output from the bottom hold circuit, and a maximum level selector which selects a higher one of the signals output from said first peak hold circuit and said bottom level shift circuit;

an offset canceler circuit for canceling an offset of said pre-amplifier by utilizing the positive and negative signals output from said pre-amplifier, the output signal from said second peak hold circuit and the output signal from said level shift circuit; and a comparator for distinguishing an output signal supplied from said offset canceler circuit using a predetermined threshold to deliver a binary signal having high and low levels.

2. An optical receiver circuit according to claim 1, further comprising:

a reset circuit for resetting said first and second peak hold circuits and said bottom hold circuit with predetermined timing on input of an external reset signal.

3. An optical module provided with an optical receiver circuit comprising:

a photodetector for converting an optical signal into an electrical signal;

a pre-amplifier for amplifying the electrical signal to output positive and negative signals;

a first peak hold circuit for holding a maximum level value of the positive signal output from said pre-amplifier;

a second peak hold circuit for holding a maximum level value of the negative signal output from said pre-amplifier;

a level shift circuit for making an output signal level of said first peak hold circuit higher than an actual level for a period of time that an amplitude of the positive signal output from said pre-amplifier is smaller than a predetermined amplitude value, said level shift circuit including a bottom hold circuit for holding a minimum level value of the positive signal output from said pre-amplifier, a bottom level shift circuit for increasing an output signal level of said bottom hold circuit by a predetermined value, and a maximum level selector circuit for selectively delivering an output signal of said first peak hold circuit or an output signal of said bottom level shift circuit, whichever is higher in terms of signal level;

an offset canceler circuit for canceling an offset of said pre-amplifier by utilizing the positive and negative signals output from said pre-amplifier, the output signal from said second peak hold circuit and the output signal from said level shift circuit; and a comparator for distinguishing an output signal supplied from said offset canceler circuit using a predetermined threshold to deliver a binary signal having high and low levels.

4. An optical module according to claim 3, further comprising:

a reset circuit for resetting said first and second peak hold circuit and said bottom bold circuit with predetermined timing on input of an external reset signal.

5. An optical receiver circuit comprising:

a pre-amplifier for amplifying a signal supplied from a photodetector to output positive and negative signals;

a first peak hold circuit for detecting a maximum level of the positive signal output from said pre-amplifier;

a second peak hold circuit for detecting a maximum level of the negative signal output from said pre-amplifier;

an offset canceler circuit from compensating the positive signal at an output signal level of said first peak hold circuit with a predetermined signal level higher than an actually detected maximum signal level for a period of time that light input to the photodetector is in a no-input signal state;

a level shift circuit for making an output signal level of said first peak hold circuit higher than an actual level for a period of time that an amplitude of the positive signal output from said pre-amplifier is smaller than a predetermined amplitude value;

wherein said level shift circuit includes a bottom hold circuit for holding a bottom value of the positive signal output from said pre-amplifier, a bottom level shift circuit for shifting a level of a signal output from the bottom hold circuit, and a maximum level selector which selects a higher one of the signals output from said first peak hold circuit and said bottom level shift circuit, whereby the negative signal is compensated at the predetermined signal level.

* * * * *